UNITED STATES PATENT OFFICE.

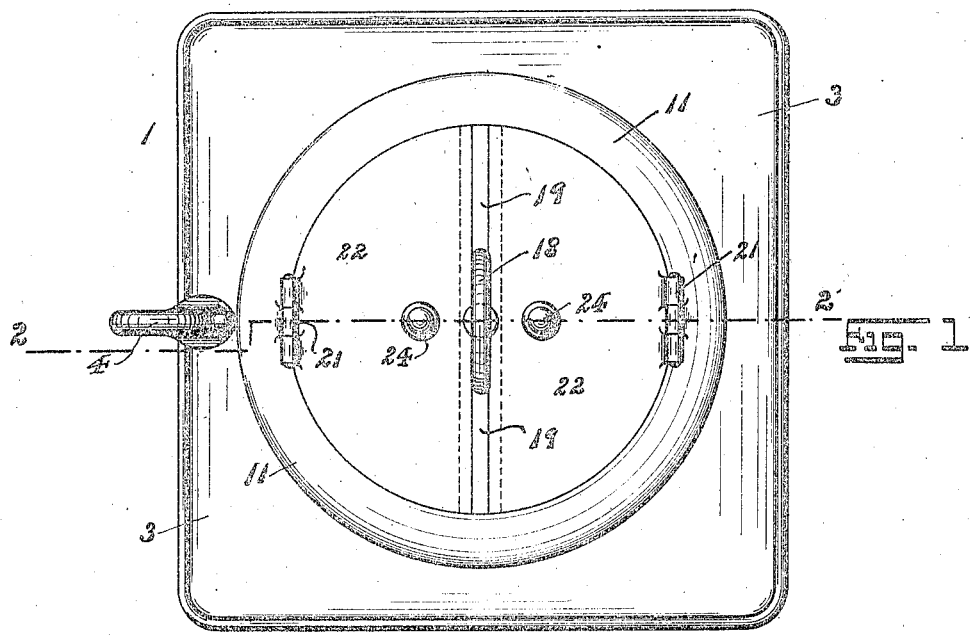
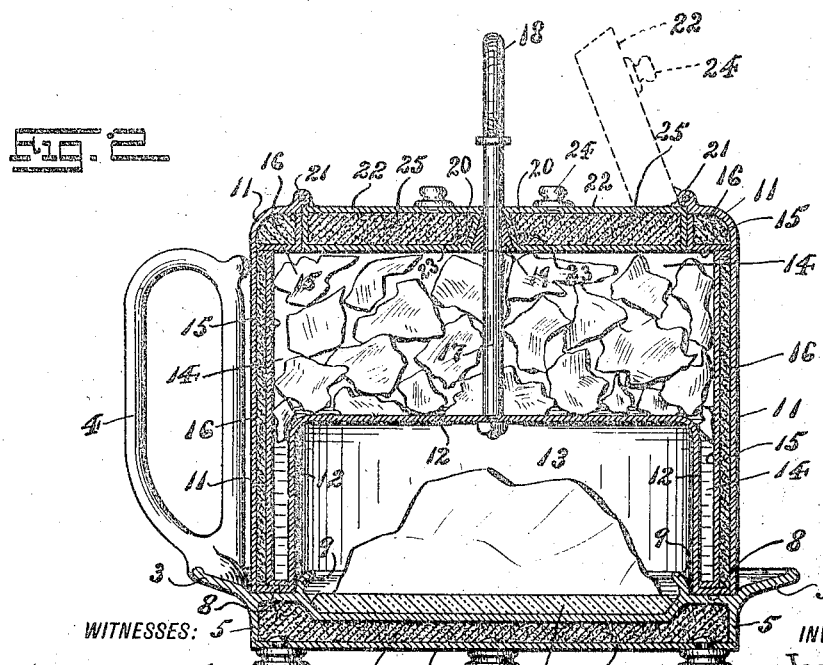

JOSEPH WRIGHT, OF GERMANTOWN, PENNSYLVANIA.

FOOD-RECEPTACLE.

1,083,718. Specification of Letters Patent. Patented Jan. 6, 1914.

Application filed September 27, 1911. Serial No. 651,477.

*To all whom it may concern:*

Be it known that I, JOSEPH WRIGHT, citizen of the United States, residing at Germantown, in the county of Philadelphia and State of Pennsylvania, have invented certain new and useful Improvements in Food-Receptacles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in portable food receptacles for table use; and the invention refers, more particularly, to that class of receptacles adapted to contain butter, or similar food products.

The present invention has for its principal object to provide a food receptacle adapted to keep its contents cool and firm by means of a surrounding body of ice, or other cooling element, the same being so arranged that the ice cannot come in direct contact with the food, whereby the latter becomes watersoaked, or contaminated by any unsanitary element which may be contained in the ice or water melted therefrom.

Other objects of the present invention, not at this time more particularly enumerated, will be clearly understood from the following detailed description of my present invention.

With the various objects of my present invention in view, the same consists in the novel construction of food receptacle hereinafter set forth; and, furthermore, this invention consists in the novel arrangements and combinations of the various parts, as well as in the details of the construction thereof, all of which will be hereinafter more fully described, and then finally embodied in the claim which is appended to and which forms an essential part of this specification.

The invention is clearly illustrated in the accompanying drawing, in which:—

Figure 1 is a top or plan view of one form of the novel construction of food receptacle for table use, embodying the principles of my present invention; Fig. 2 is a vertical longitudinal section of the same taken on line 2—2 in said Fig. 1.

Similar characters of reference are employed in both of the above described views to indicate corresponding parts.

Referring now to said drawings the reference-character 1 indicates the complete food receptacle for table use made according to and embodying the principles of my present invention. This food receptacle 1 comprises a plate or dish 2, provided with a suitably extending rim-flange 3, the latter being of sufficient size to provide a knife-rest. The said plate or dish 2 is further provided, if desired, with a handle-portion 4, connected, preferably, with said rim-flange, and said handle-portion may be made in such various shapes and designs as may be found desirable. Said plate or dish 2 is preferably provided with a suitably arranged annular flange 5, at the bottom portion thereof, which in connection with a bottom-wall 6, provides a hollow body which may be filled with some desirable material 7 which is a poor heat conductor, so as to serve as an insulator to prevent the radiation of heat to the interior of the plate or dish. Such a material would be asbestos, mineral-wool, or the like. Said plate or dish is further provided with an annular seat 8, the same lying between said rim-flange 3 and an upwardly extending annular flange 9. Arranged within the inner space bounded by said annular flange 9, so as to be supported by said dish, is a food supporting plate 10, the same being made of glass, porcelain, or other suitable material, providing equal sanitary advantages.

Adapted to be arranged with said plate or dish 2 is a cover member, the marginal edges of which are adapted to be seated upon said seat 8, to properly support said cover-member in its relation to said plate or dish. Said cover member comprises an outer shell 11 and an inner shell 12, the latter being in the form of a hood providing a chambered space 13 adapted to register above the food contained upon said plate or dish. Said outer shell 11 and said inner shell 12 are so combined together as to provide an inner chamber 14 arranged above and around said chambered space 13 and separated therefrom by said inner shell 12. The walls of said outer shell 11 may be provided with the double wall members 15 to provide an intervening space for the reception of suitable heat insulating material 16, such as asbestos, mineral wool, or the like. Suitably secured to said inner shell 12 is an upwardly extending rod 17, terminating at its upper end in a handle-member 18, by means of which said cover member may be placed upon or removed from said plate or dish. Connected with said rod 17 is a transversely extending rest 19, the same possessing chamfered sides 20. The said outer shell 11 is provided with an opening in its upper portion in which said rest 19 registers. Pivotally secured, by means of hinge-members 21, to the marginal edges of said opening in the upper portion of said outer shell 11, are a pair of door-members 22, the free ends of which are chamfered, as at 23, and which engage said chamfered sides 20 of said rest 19 when said door-members are closed, thereby closing said inner chamber 14. The said door-members 22 are provided with suitable knob-portions 24, for manipulating the same. Said door-members are preferably formed of hollow shells, providing a space for the reception of suitable heat insulating material 25, of the nature above described. It will be obvious that the door-members 22 when opened give access to the interior of said inner chamber 14, and provide a means of filling said inner chamber with ice, or other suitable cooling agent. The ice and the water therefrom, as contained in said inner chamber 14, surround the chambered space 13 in which the food supported by said plate or dish is inclosed when said cover-member is arranged upon said plate or dish, but the same is prevented from having any physical contact with the food, hence, the food, while benefiting from the cooling or refrigerating effects of the ice, is not water soaked or otherwise contaminated. The outer shell and door members being thoroughly insulated, as described, the heat is excluded, and the quantity of ice necessary to produce the proper refrigeration is consequently economized. The cover-member is easily manipulated to remove the same from the plate or dish to give access to the food, and the same is so constructed that the ice, or water therefrom, cannot spill upon the table, and soil the same when the cover-member is moved. As a food receptacle for the table, the device above described will readily commend itself, and its adaptability and advantages as a butter-dish, or the like, will be readily appreciated.

I am aware that changes may be made in the general arrangements and combinations of the devices and parts, as well as in the details of the construction of the same, as described in the accompanying specification, without departing from the scope of my present invention as defined in the claim which is appended to the said specification. Hence, I do not limit my invention to the exact arrangements and combinations of the devices and parts as set forth in the foregoing specification, nor do I confine myself to the exact details of the construction of the said parts as illustrated in the accompanying drawing.

I claim:—

In a device of the character described, a food-receptacle comprising a hollow body-portion, a heat-insulating medium contained in said hollow body-portion, a channeled flange forming a seat connected with the upper marginal edges of said hollow body-portion, a cover-member comprising an inner and outer shell arranged together to provide an open chambered space in the lower end of said cover-member and an inclosed space within said shells, wall members arranged within said outer shell to provide intervening spaces between said wall members and said outer shell, a heat-insulating medium contained in said spaces, said outer shell having an opening in its upper end giving access to said inclosed space within said shells, and hollow door-portions pivoted to said outer shell so as to close said opening, and a heat-insulating medium contained in said hollow door-portions.

In testimony, that I claim the invention set forth above I have hereunto set my hand this twenty-third day of September, 1911.

JOSEPH WRIGHT.

Witnesses:
 SALOME B. CORLE,
 JOHN A. BARRY.